July 17, 1951     T. STEVENSON     2,560,667
PISTON RING

Filed May 7, 1949                                                          2 Sheets-Sheet 1

INVENTOR
TERESA STEVENSON
BY
Howard P. King
ATTORNEY

July 17, 1951
T. STEVENSON
2,560,667
PISTON RING
Filed May 7, 1949
2 Sheets-Sheet 2
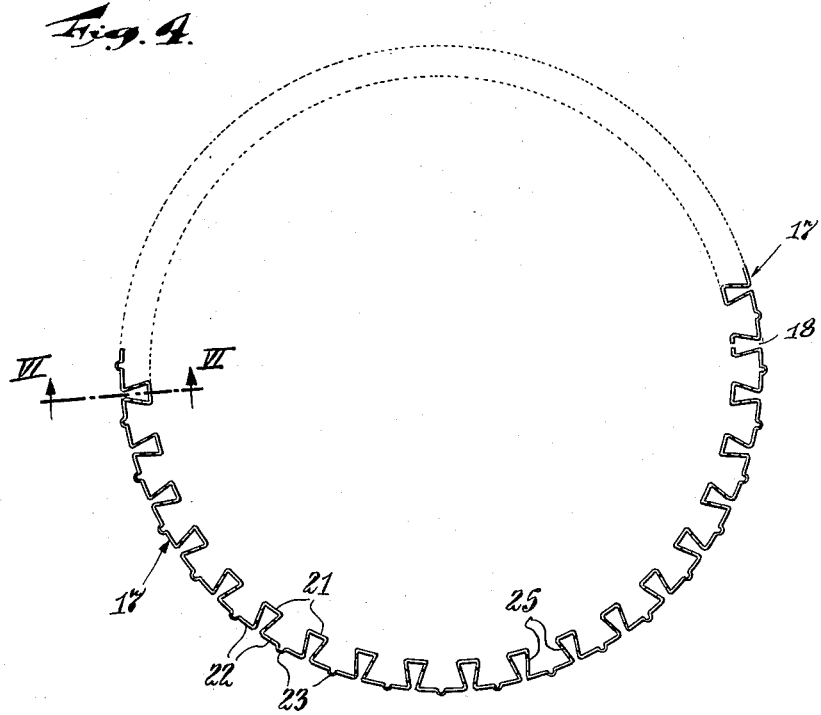
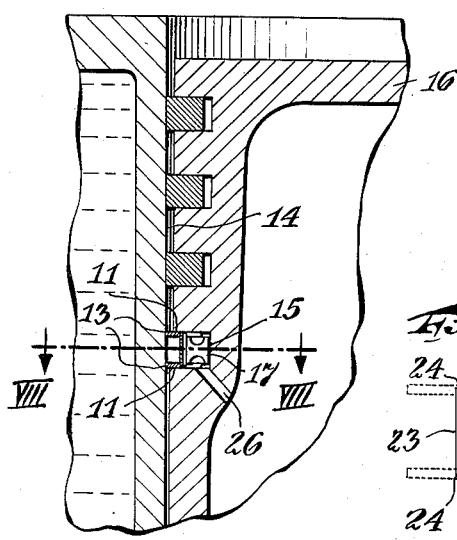
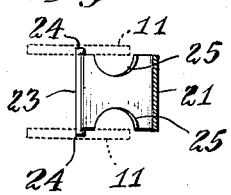
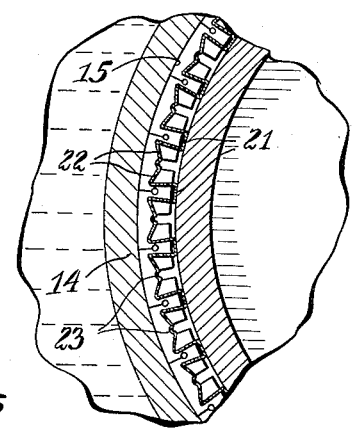
INVENTOR
TERESA STEVENSON.
BY
Howard R. King
ATTORNEY Patented July 17, 1951

2,560,667

UNITED STATES PATENT OFFICE 2,560,667

PISTON RING

Teresa Stevenson, Summit, N. J.

Application May 7, 1949, Serial No. 92,031

15 Claims. (Cl. 309—45)

This invention relates to improvements in piston rings and more particularly to oil control rings, and while adapted primarily for use in internal combustion engines, it is not limited thereto, but may be employed successfully elsewhere such as in steam engines, pumps and similar devices wherein it is necessary or desirable to prevent or control escape of oil along the cylinder wall.

A basic object of the invention is to provide an oil control ring of great flexibility which is capable of conforming to cylinders that are out-of-round or which have irregularities or local distortions, the invention thereby having the important advantage of beneficial use with engines or other devices the cylinder bores whereof are worn or locally distorted or otherwise no longer represent a true cylindric contour.

Another object of the invention is to provide a piston ring which can be made of sheet and strip material, such as high carbon steel, and which can be heat treated and hardened.

A further object of the invention is to provide a resilient retainer separately manufactured from the portions of the ring that provide the wear surface for enabling the wear surface to be differently processed from said retainer.

Yet another object is to provide an interlocking assembly of the wear-surface members with said retainer.

A still further object of the invention is to provide a structure of ring conducive to ready assembly and installation.

Again, an object of the invention is to provide a retainer the resilient force whereof is applied at shortly spaced intervals along the length of the wear-surface members.

Another object of the invention is to provide for even application of the spring tension exerting radially outward pressure throughout the length of the wear-surface members.

As a corollary to the above object, is the purpose to develop the most perfect polar diagram possible in a piston ring of radial tension of the wear-surface members against the cylinder wall.

To fulfill a practical consideration of use of the ring, an object of the invention is to provide a construction which will continue to function without appreciable reduction of efficiency even should the resilient retainer be broken during operation.

Other objects of the invention will appear to those versed in the art to which it appertains as the description proceeds, both by direct reference thereto and by implication from the context.

Referring to the accompanying drawings in which like numerals of reference indicate similar parts throughout the several views:

Fig. 4 is a sectional plan of the resilient retainer;

Fig. 5 is an edge view of said retainer;

Fig. 6 is an enlarged sectional view on line VI—VI of Fig. 5;

Fig. 7 is a sectional view of a portion of a piston and cylinder showing one of the rings of the present invention in place in one of the piston grooves; and Fig. 8 is a cross-sectional view on line VIII—VIII of Fig. 7.

Figure 1:
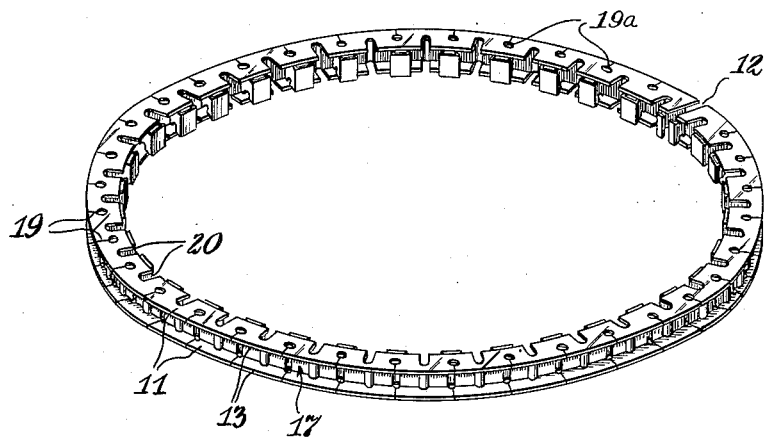
Fig. 1 is a perspective view of a piston ring completely assembled and embodying my invention.
Figure 2:
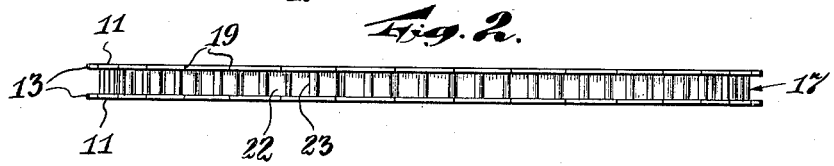
Fig. 2 is an edge view of the same.
Figure 3:
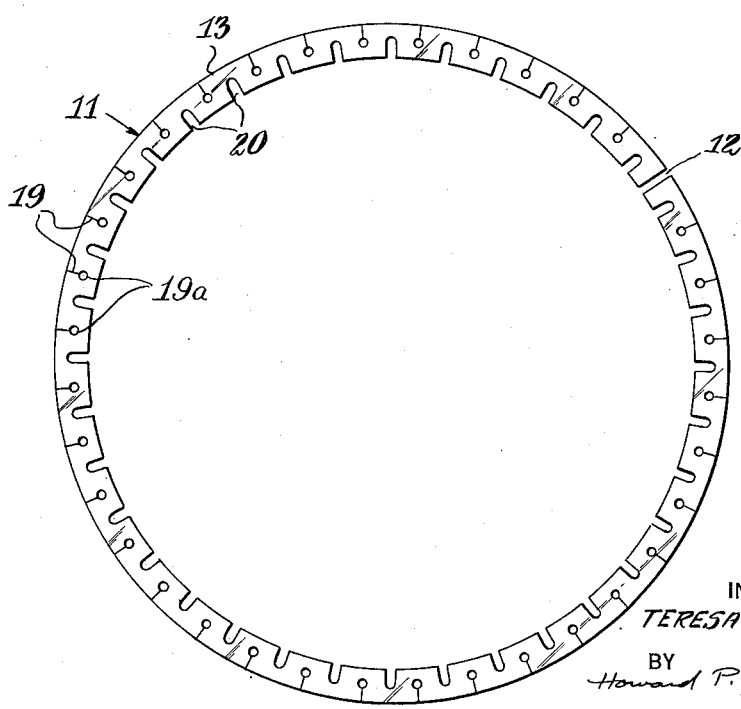
Fig. 3 is a plan of one of the wear-surface members.

In the specific embodiment of the invention illustrated in said drawing, the piston ring shown comprises essentially three parts, of which two are wear-surface members 11 located in parallel planes at the top and bottom of the ring, are annular and split as at 12, at one radial part, and resilient so their outer peripheries 13 or wear surfaces will ride in contact with a cylinder 14 when the ring is incorporated in the prepared groove 15 of an engine or other piston 16. The third of said essential three parts of the ring is a resilient retainer 17 disposed between the two said members and having a generally annular configuration agreeable to the size and shape of said members, and having an interlocking, pressure-transmitting engagement with the said members and also split, as at 18, and with said split registering with the splits 12 of the two said members. The three said parts are separable from each other, until applied in the piston groove merely by lifting one part from another by movement in an axial direction. However, when the ring is assembled and placed in the piston groove, the lands next the grooves prevent material relative movement axially of one part of the ring with respect to another said part and the ring will accordingly be retained in assembled condition. Radial expansive tension of the members is supplemented by the resilient expansive tension exerted thereon by the said retainer through the interlocking engagement of the retainer with said members.

Describing the said parts in greater detail, said members 11 are flat rings preferably of resilient ferrous material, such as steel, and are rendered capable of flexing each in its own plane by provision of radial cuts partway across the members. As shown, an annular outer series of slits 19 is provided, the slits of which extend radially inwardly from the outer periphery 13 approximately or a little more than half way across said member, and another annular but inner series of cuts 20 is also provided each cut of which extends radially outwardly from the inner periphery of the ring and likewise for approximately or a little more than half way across said members. The cuts of each series are evenly spaced from each other and the cuts of the series of cuts are staggered with respect to the slits in the same member and about half way between the slits of the series of slits. The slits 19 of the outer series are made to be normally as nearly closed as possible in use, that is to say, the sides of the slits are in closed contact against each other in order that the outer periphery of the member shall be in effect substantially continuous for oil wiping purposes. At the radially inward ends of the slits are terminal apertures 19a of curvilinear cross-section to avoid likelihood of the ring member cracking in continuation of the slit. The cuts 20 extending radially from the inner periphery, however, have material width for purposes which will appear subsequently herein. It may be pointed out here, that the distances or widths of metal from any aperture 19a to the cuts 20 at both sides of the selected aperture are equal to each other and substantially equal to the radial width of metal from the aperture to the inner periphery of the member and to the width of metal from the closed end of cut 20 to the outer periphery of the member, for encouraging equal flexing at the several slits and cuts throughout the circular series thereof when the ring member is spread.

The retainer is fabricated from a strip of spring steel or other suitable resilient material, the general width whereof is equal to the desired spacing of the said members within the piston groove. This strip is bent repetitiously to provide a series of radially disposed loops 21 of which the heads of the loops are toward the inner periphery of the retainer and the legs of the loops are approximately radially disposed with the opening of each loop toward the outer periphery of the ring. The successive loops are integral by virtue of the bends of the strip of material providing peripherally disposed gibs 22 between legs of successive loops. Midway of the length of each gib, the material is shown as each having a rib 23 perpendicular to the peripheral dimension of said gib, said rib also projecting laterally from the longitudinal edges of the gib, a distance substantially equal to or slightly less than the thickness of the ring member 11, and each projecting end of the rib thereby constituting a short pintle 24 of semicircular cross section, which will project into one of said cuts 20 of the juxtaposed ring member 11. The loops and gibs are made of appropriate dimensions so that the spacing of the ribs and pintles is agreeable to the spacing of said cuts and thus a pintle is located in each said cut and the said members otherwise engage against the edges of the retainer. By virtue of the pintles projecting into said cuts of the members at the closed ends of said cuts, and by virtue of the radially outward tension inherent in said retainer, each pintle is exerting a radially outward spring pressure tending to expand the member 11 against the cylinder wall, but until the ring is placed in the ring-receiving groove of the piston the tension of the retainer does not suffice to materially expand the ring members beyond their initial or normal diameters. Furthermore, each pintle is midway of the length of the member segment between the outer radial slits and thus each segment has a resilient moment applied thereto radially outward so the several segments will follow irregularities of the cylinder wall and maintain close, oil-scraping contact therewith.

It may here be pointed out that the peripherally outer faces of the gibs are spaced inwardly from the outer or wear-faces of the members 11, so there is an oil-receiving channel peripherally of the ring between said members. Each loop leg preferably has an oil opening or port 25 therethrough, by which oil from the said oil-receiving channel may pass to the inside of the gib to the space therebehind within the groove in the piston, and suitable or usual discharge outlets 26 are provided in the piston from the said grooves to the hollow interior of the piston, whereby the oil is returned to the base of the engine.

The closed ends or heads of loops 21 of the retainer preferably extend radially inwardly beyond the inner periphery of said members 11 and may be conveniently proportioned so as to engage the base of the groove in the piston. Consequently, the legs of the loops are not radially depressible, but may flex laterally in a direction peripherally of the ring. However, the gibs connecting legs of successive loops may flex radially of the ring, and it is this flexing of the gibs which exerts the major resilient outward tension on the ring member segments. Even should the retainer break at any peripheral part thereof, and thereby possibly release the outward tension applied by any one gib, the other gibs continue to function without any detrimental effect from the break and tension of gibs next adjacent the one where the break occurred will transmit sufficient outward pressure on the affected segment of the member to still maintain good oil-wiping contact of that segment to avoid any material loss of efficiency of the ring as a whole.

Although one specific embodiment of the present invention has been shown and described, it is to be understood that other modifications thereof may be made without departing from the spirit and scope of the appended claims.

I claim:

1. A piston ring comprising two parallel and spaced apart wear-surface members having a plurality of cuts and slits therein, said cuts being open and the slits being closed, said cuts and slits being disposed in a circular series in each of said members, and a resilient retainer interposed between said members and having pintles projecting therefrom into said cuts of said members for exerting radial tension on said members in contact with a cylinder wall in an outward radial direction, said resilient retainer having a plurality of vents to permit oil flow from the exterior to the interior of the ring, and the contiguous sides of each of said slits being in direct contact with each other, and the radially inward end of each said slit having an aperture terminating the slit thereat.

2. A piston ring comprising two parallel and spaced apart wear-surface members having a plurality of cuts and slits therein, said cuts being open and the slits being normally closed, said cuts and slits being disposed in a circular series in each of said members, and a resilient retainer interposed between said members and having pintles projecting therefrom into said cuts of said members for exerting radial tension on said members in contact with a cylinder wall in an outward radial direction, said resilient retainer having a plurality of vents to permit oil flow from the exterior to the interior of the ring, and the contiguous sides of each of said slits being in direct contact with each other, and the radially inward end of each slit having an aperture terminating the slit thereat, and said slits adapted to open in use for accommodating the member to an outwardly distorted cylinder wall.

3. A piston ring comprising two parallel and spaced apart wear-surface members each having a plurality of alternating cuts and slits therein, said cuts being open and the slits being normally closed, said cuts and slits being disposed in a circular series in each of said members, and a resilient retainer interposed between said members and having pintles projecting therefrom into said cuts of said members for exerting radial tension on said members in contact with a cylinder wall in an outward radial direction, said resilient retainer having a plurality of vents to permit oil flow from the exterior to the interior of the ring, and the contiguous sides of each of said slits being in direct contact with each other and remaining in closed contact under conditions of use of an inwardly distorted cylinder wall, and said cuts being adapted to spread wider open in use for accommodating the member to such an inwardly distorted cylinder wall.

4. A piston ring comprising two parallel and spaced apart wear-surface members having a plurality of cuts and slits therein, said cuts extending toward and being open at the inner periphery of the member and the slits being closed and extending to the outer periphery of the member, said cuts and slits being disposed in circular series in each of said members, and a resilient retainer interposed between said members and having pintles projecting therefrom into said cuts of said members for exerting radial tension on said members in contact with a cylinder wall in an outward radial direction, said resilient retainer having a plurality of vents to permit oil flow from the exterior to the interior of the ring, and the contiguous sides of each of the slits being in direct contact with each other in normal shape of the ring and in use in a cylinder when the wall whereof is not distorted where in contact with the ring.

5. A piston ring comprising two parallel and spaced apart wear-surface members having a plurality of cuts and slits therein, said cuts extending radially of the member and each cut being open lengthwise of itself and opening at the inner periphery of the member, and the slits being radial and extending to the outer periphery of the member and normally closed, said cuts of each member being disposed in a circular series and the said slits of each member being disposed in another circular series, and a resilient retainer interposed between said members and having pintles projecting therefrom into said cuts of said members for exerting radial tension on said members in contact with a cylinder wall in an outward direction, said cuts and slits accommodating inward and outward flexing of the members and the opening and closing of said slits being automatically controlled by distortion condition of the wall of the cylinder wherein the ring is used.

6. A piston ring comprising two parallel and spaced apart wear-surface members each having a plurality of alternating cuts and slits therein of which the cuts extend to the inner periphery of the member and the slits extend to the outer periphery of the member and the other ends of the cuts and slits terminate medially between said peripheries, the cuts and slits having spacing from each other such that the distances of each cut from the next adjacent slits are substantially equal to each other and substantially equal to the distances intervening between the medial terminal of the cut and outer periphery and medial terminal of the slit and inner periphery for obtaining uniform flexibility.

7. A piston ring having a radial split severing the ring thereat for expanding and contracting purposes and providing ring ends at the said split, said ring comprising two parallel and spaced apart wear-surface members each having a plurality of cuts and slits therein of which the cuts extend to the inner periphery and the slits extend to the outer periphery of the member and the other ends of the cuts and slits terminate medially between the peripheries, said cuts being open throughout their lengths and the contiguous sides of each of said slits being in direct contact with each other, whereby the outer periphery of each said member is substantially a continuous edge from end to end of the ring, and each said slit being located between pairs of cuts and the cuts located symmetrically and in uniform relation in respect to the slits.

8. A piston ring comprising two parallel and spaced apart wear-surface members having a plurality of cuts and slits therein, said cuts being open and the slits being closed, said cuts and slits being disposed in a circular series in each of said members, and a resilient retainer interposed between said members and having pintles projecting therefrom into said cuts of said members for exerting radial tension on said members, and the contiguous sides of each of said slits being in direct contact with each other, and the radially inward end of each said slit having an aperture which is curvilinear in cross section and which terminates the slit.

9. A piston ring comprising two parallel and spaced apart wear-surface members having a plurality of cuts and slits therein, said cuts being open and the slits being closed, said cuts and slits being disposed in a circular series in each of said members, and a resilient retainer dimensioned to lie between said members and compressible radially to lie entirely between the inner and outer peripheries of said members under pressure conditions of use, and said retainer having pintles projecting therefrom into said cuts of said members whereby compression of the retainer applies pressure through said pintles to said members and toward the outer periphery, the contiguous sides of the slits being in direct contact with each other whereby the outer periphery is substantially continuous and adapted to present a substantially complete peripheral contact with a cylinder in use.

10. A piston ring comprising two parallel and spaced apart wear-surface members having a plurality of cuts and slits therein, said cuts being open and the slits being closed, and the cuts being interposed between the slits, the portions of said members between successive slits constituting segments and each segment having one of said cuts therein, and said segment having approximately uniform lateral dimensions of the material thereof from the inner end of the slit to the inner periphery and to the said cuts in adjacent segments to permit radial in and out deflection of the member, and said inner end of the slit having a circular aperture thereat terminating the slit, and a resilient retainer interposed between said members and having pintles projecting therefrom into said cuts of said members for exerting radial tension on said members and segments thereof.

11. A piston ring comprising two parallel and spaced apart wear-surface members having a plurality of cuts and slits therein, said cuts being open and the slits being closed, said cuts and slits being disposed in a circular series in each of said members, and a resilient retainer interposed between said members, said retainer having a series of loops the head ends whereof are directed radially inward and the feet ends are toward the outer periphery of said members and provide pairs of gibs connecting the feet ends of the successive loops, there being as many pairs of gibs as there are cuts in a member, and said pairs of gibs providing laterally projecting pintles, and said pintles being equal in number to the said cuts and projecting thereinto, said retainer having a vent for each loop to pass oil from the interior to the exterior of said loop.

12. A piston ring in accordance with claim 11 wherein ribs are provided at the meeting ends of the pairs of gibs, and said ribs have the ends thereof extending beyond the edges of the gibs and constitute said pintles.

13. A piston ring comprising two parallel and spaced apart wear-surface members having a plurality of cuts and slits therein, said cuts being open and the slits being closed, said cuts and slits being disposed in a circular series in each of said members, said members each having one split thereof completely diametric for severing the member thereat, and a resilient retainer interposed between said members, said retainer having a series of loops and having gibs at the foot ends of the loops connecting the successive loops, one of said loops having its head radially split and the split in juxtaposition to the splits of said members for expansion and contraction purposes, and said gibs between successive loops having pintles projecting laterally therefrom in number equal to the number of said cuts in said members and with peripheral spacing corresponding to the distance between said cuts.

14. A piston ring in accordance with claim 11 wherein the said vents are provided in the plural for each loop.

15. A piston ring in accordance with claim 1 wherein the contact of the sides of the slits is provided throughout the extent of said sides from the aperture to the outer periphery of said member.

TERESA STEVENSON.

REFERENCES CITED

The following references are of record in the file of this patent:

UNITED STATES PATENTS

| Number | Name | Date |
|---|---|---|
| 1,988,738 | Johnson | Jan. 22, 1935 |
| 2,262,311 | Zahodiakin | May 11, 1941 |
| 2,311,731 | Bowers | Feb. 23, 1943 |
| 2,319,098 | Zahodiakin | May 11, 1943 |
| 2,323,815 | Landon | July 6, 1943 |

FOREIGN PATENTS

| Number | Country | Date |
|---|---|---|
| 1,424 | Great Britain | June 24, 1858 |